(12) United States Patent
Hine et al.

(10) Patent No.: US 7,053,867 B2
(45) Date of Patent: May 30, 2006

(54) MOVEABLE IMAGE DISPLAY SYSTEM

(75) Inventors: Laurence J. Hine, 43605 Bracken Drive, Chilliwack, British Columbia (CA) V2R 4A3; Hui Li, Vancouver, WA (US)

(73) Assignee: Laurence J. Hine, Chilliwack (CA)

( * ) Notice: Subject to any disclaimer, the term of this patent is extended or adjusted under 35 U.S.C. 154(b) by 409 days.

(21) Appl. No.: 10/319,474

(22) Filed: Dec. 16, 2002

(65) Prior Publication Data

US 2003/0117344 A1    Jun. 26, 2003

(30) Foreign Application Priority Data

Dec. 14, 2001   (CA) .................................. 2365142

(51) Int. Cl.
*G09G 3/00* (2006.01)

(52) U.S. Cl. ..................... 345/31; 345/108; 345/211; 713/300; 348/730

(58) Field of Classification Search .................. 345/31, 345/108–111, 56, 40, 419, 211; 713/300, 713/310; 348/730
See application file for complete search history.

(56) References Cited

U.S. PATENT DOCUMENTS

| | | | | |
|---|---|---|---|---|
| 4,160,973 A | * | 7/1979 | Berlin, Jr. ..................... | 345/31 |
| 5,717,416 A | * | 2/1998 | Chakrabarti ................. | 345/31 |
| 5,886,442 A | * | 3/1999 | Ogino et al. ................. | 310/181 |
| 6,331,744 B1 | * | 12/2001 | Chen et al. .................. | 310/171 |
| 6,577,286 B1 | * | 6/2003 | Jang ............................. | 345/31 |

* cited by examiner

*Primary Examiner*—Regina Liang
*Assistant Examiner*—Jennifer T. Nguyen
(74) *Attorney, Agent, or Firm*—Clifford W. Vermette; Vermette & Co.

(57) ABSTRACT

The present invention relates to a moveable image display system comprising a plurality of moveable display frames, capable of displaying images, a power transmitter and a data transmitter. There are no electrical connections between the moveable display frames and the data or power sources, however the moveable display frames are mechanically and electrically connected to each other. The moveable display frames are capable of moving relative to each other and are capable of moving together relative to the data and power sources.

25 Claims, 9 Drawing Sheets

MOVEABLE IMAGE DISPLAY SYSTEM

FIELD OF THE INVENTION

The present invention relates to a device for displaying images on moving surfaces.

BACKGROUND

There is an ever-increasing demand for new means for conveying visual information. In particular, the advertising industry continuously seeks to make use of more and more communicative media to convey visual information. Advertisers use not only traditional communicative media such as newspapers, magazines, billboards and television, but also the internet, the sides of buses and taxis, disposable cups, beverages, t-shirts, walls and floor space. Virtually any surface that can be effectively used to present information in a visual form is used to advertise.

Provided a suitable medium, such as that provided by the present invention, many moving surfaces can be utilized to convey non-advertising information such as news, tourist information and directions.

Accordingly, it is an object of the present invention to provide an apparatus for displaying images and other visual information on moving surfaces, such as those on escalators, moving sidewalks, rotating signs, billboards, baggage carousels and the like.

SUMMARY OF THE INVENTION

According to the invention there is provided a moveable display system having a fixed framework, a moveable framework having a frame attached thereto, said moveable framework moveable relative to the fixed framework. A data transceiver is coupled to each of the fixed and moveable frameworks and is operative to transmit data between the fixed framework and the moveable framework. A power transmitter is coupled to the fixed framework and a power receiver is coupled to the moveable framework without ant electrical connection between the power transmitter and the power receiver. The frame has overlapping coils. The fixed framework has a magnetic flux generator which produces a time varying magnetic field. The frame overlapping coils move periodically through the time varying magnetic flux, thereby having induced in said frame overlapping coils, three-phase power. The frame and the display area are operative to display video and/or text from the data.

The magnetic flux generator may be a row of partially overlapping coils driven by an inverter.

The moveable display frames are electrically linked to one another such that power and data from one moveable display frame can be sent to the other moveable display frames.

In an alternate embodiment the moveable display frames form the plates of a baggage carousel. The invention therefore provides a means for displaying images on the plates of baggage carousels.

A power transmitter consists of one or more time variable magnetic flux generators (TVMFGs) The TVMFGS are placed in fixed positions proximate to the moveable display frames. In a preferred embodiment, the time variable magnetic flux generated by the power transmitter is created by induction by an AC current. Alternatively, the time variable magnetic flux may be generated by a moving permanent magnet.

The moveable display frames each include a power generator coil in which a current is induced by the time variable magnetic flux generated by the TVMFGs of the power transmitters. As the moveable display frames move relative to the power transmitters, at least one of the moveable display frames will be sufficiently proximate to a power transmitter to receive power any given point in time. The moveable display frames are connected to each other by electric cables such that those moveable display frames that are not sufficiently proximate to the TVMFGs to directly receive power therefrom, receive power from the moveable display frames that are sufficiently proximate to the TVMFGs to receive power.

The spacing between TVMFGs and between power generator coils of adjacent moveable display frames must be such that at all times at least one power generator coil is sufficiently close to a TVMFG to receive power. The power received by the power generator coil is shared with the other moveable display frames via the electric cables linking the moveable display frames.

At least one data transmitter is fixed in a position sufficiently proximate to the moveable display frames to transmit data to the moveable display frames. In a preferred embodiment, the data transmitters transmit data via infrared light emitting diodes controlled by a microcontroller. However, data transmission may be achieved by other suitable means, such as ultrasonic or wireless transmission.

The moveable display frames each include a data receiver for receiving data transmitted by the data transmitter. In a preferred embodiment, the data receiver takes the form of an infrared light emitting diode and receiver circuit. However, the data receiver may take any form appropriate to the modality of the data transmitter.

As the moveable display frames move relative to the data transmitters at least one of the moveable display frames will be receiving data from the data transmitters at any given point in time. The moveable display frames are connected to each other by electric cables such that those moveable display frames that are not sufficiently proximate to the data transmitters to receive data therefrom, receive data from the moveable display frames that are sufficiently proximate to the data transmitters to receive data.

The spacing between data transmitters and between data receivers of adjacent moveable display frames must be such that at all times at least one data receiver is sufficiently close to a data transmitter to receive data therefrom. The data received by that data receiver is then shared with the other moveable display frames via electric cables linking the moveable display frames.

Each moveable display frame includes a data receiver, display controller and display panel, all of which are powered by the current supplied to the moveable display frames by the TVMFGs. In a preferred embodiment the display panels include a plurality of arrays of LED's. However, the display panels could alternatively include LCD, plasma displays, or any other suitable method of displaying images. The display panels may additionally include data buffers to store incoming digital display data, and digital to analog converters to convert the incoming digital display data to analog voltage signals to control the brightness of the LED's. The display controller identifies data intended for that moveable display frame and distributes the data to the display panel of that display frame.

Alternative embodiments of the present invention could be used for displaying images on the steps of escalators, on moving sidewalks, or on moving signs or billboards.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1A:
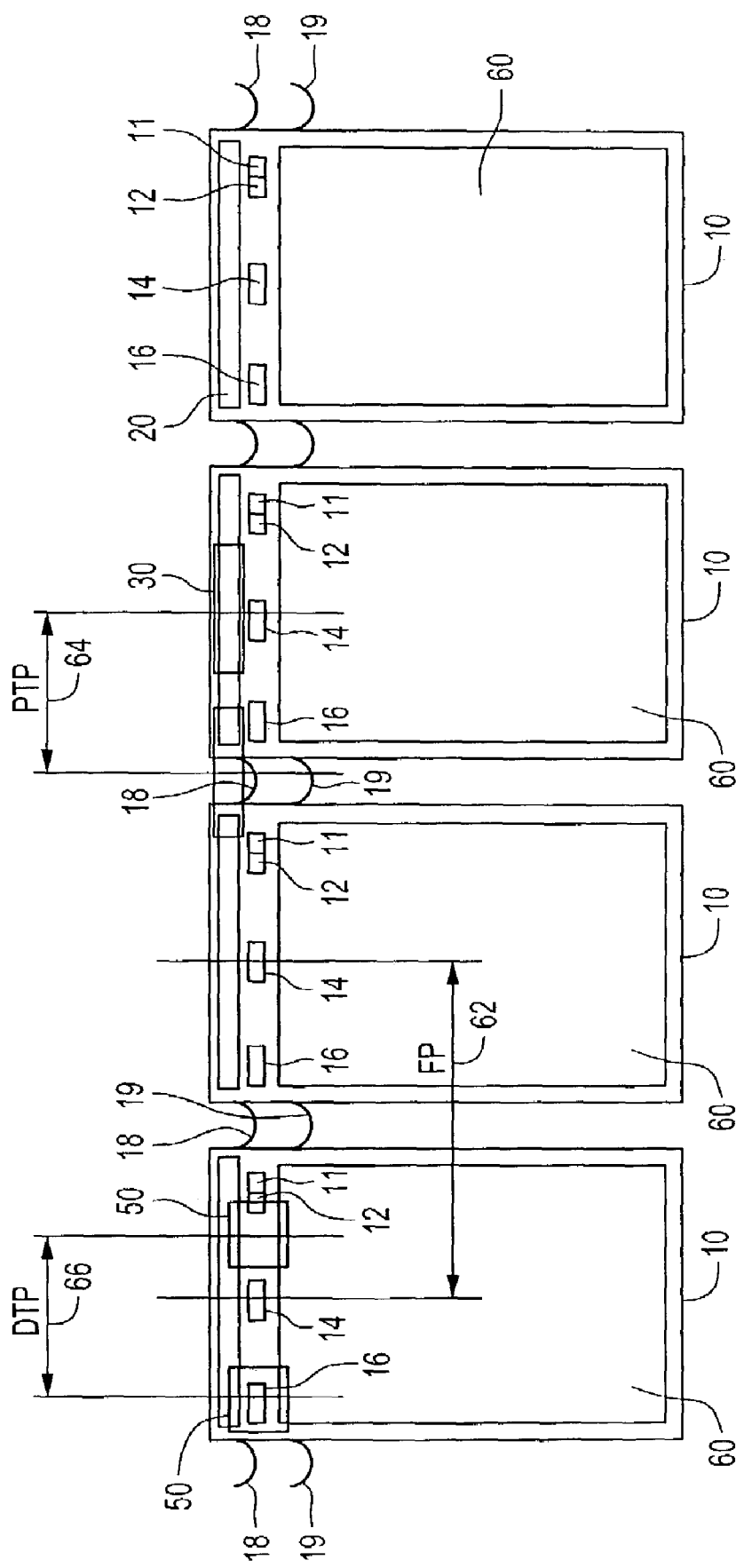
FIG. 1A is a top view of a plurality of moveable display frames, infrared data transmitters and time variable magnetic flux generators.
Figure 1B:
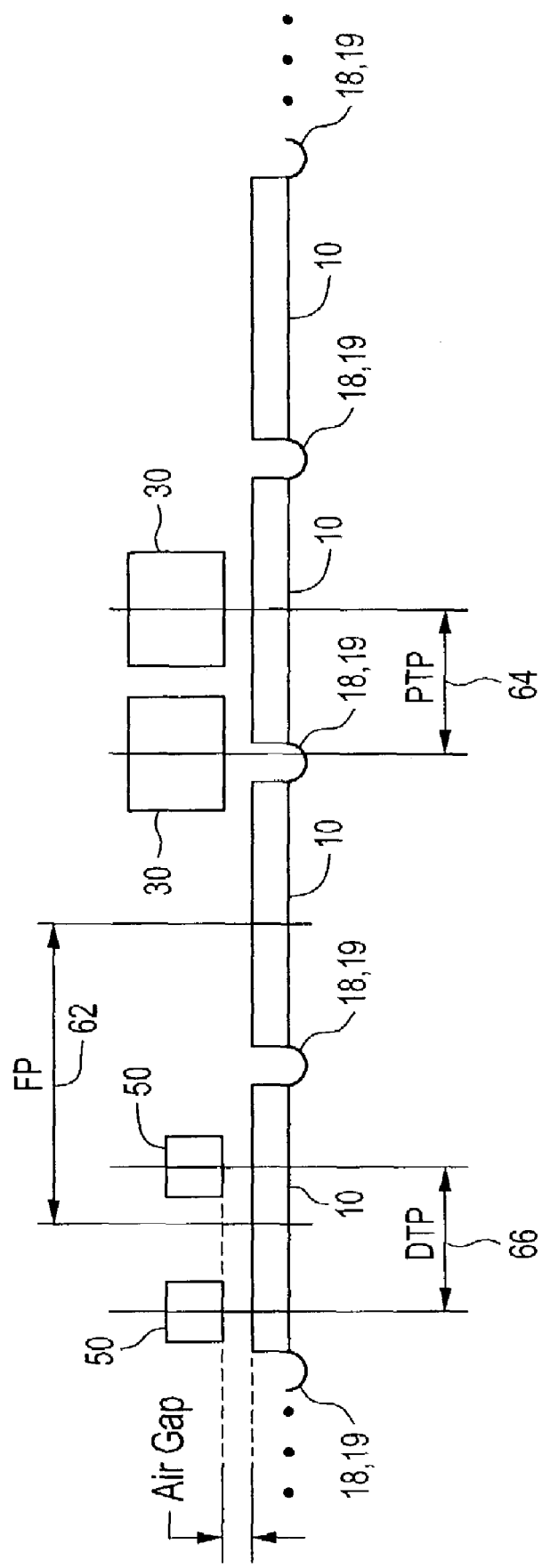
FIG. 1B is a side view of a plurality of moveable display frames, infrared data transmitters and time variable magnetic flux generators.

Referring to FIGS. 1A and 1B, four moveable display frames 10 are shown. Adjacent ones of moveable display frames 10 are connected by data cables 18 and power cables 19. Time variable magnetic flux generators (TVMFG) 30 and infrared data transmitters 50 are shown mounted above moveable display frames 10. The TVMFGs 30 provide power to the moveable display frames 10 but are not physically connected to the moveable display frames 10. Similarly, the infrared data transmitters 50 provide data to the moveable display frames 10 but are not physically connected to the moveable display frames 10. Although there is no contact, the closer the TVMFGs 30 and infrared data transmitters 50 are to the moveable display frames 10 the more efficient the power and data transfer. The TVMFGs 30 and infrared data transmitters 50 are fixed in position and do not move with the moveable display frames 10.

In a preferred embodiment, the moveable display frames 10 form the plates of a baggage carousel such as would be used in an airport. Accordingly, in addition to the data cables 18 and power cables 19, the moveable display frames 10 are physically connected to each other by means (not shown), appropriate to their function as plates of a baggage carousel. The moveable display frames may form the entire plate or be incorporated into a plate of a baggage carousel.

Referring to FIG. 1A, each one of the moveable display frames 10 includes a display panel 60, AC power generator coil 20, an infrared data receiver 16, a display controller 14, an AC to DC rectifier 11 and DC to DC converter 12. Frame pitch (FP) 62 is the center-to-center distance between moveable display frames 10. The center-to-center distance between TVMFGs 30 is the power transmitter pitch (PTP) 64. The center-to-center distance between adjacent infrared data transmitters 50 is the data transmitter pitch (DTP) 66.

Figure 2:
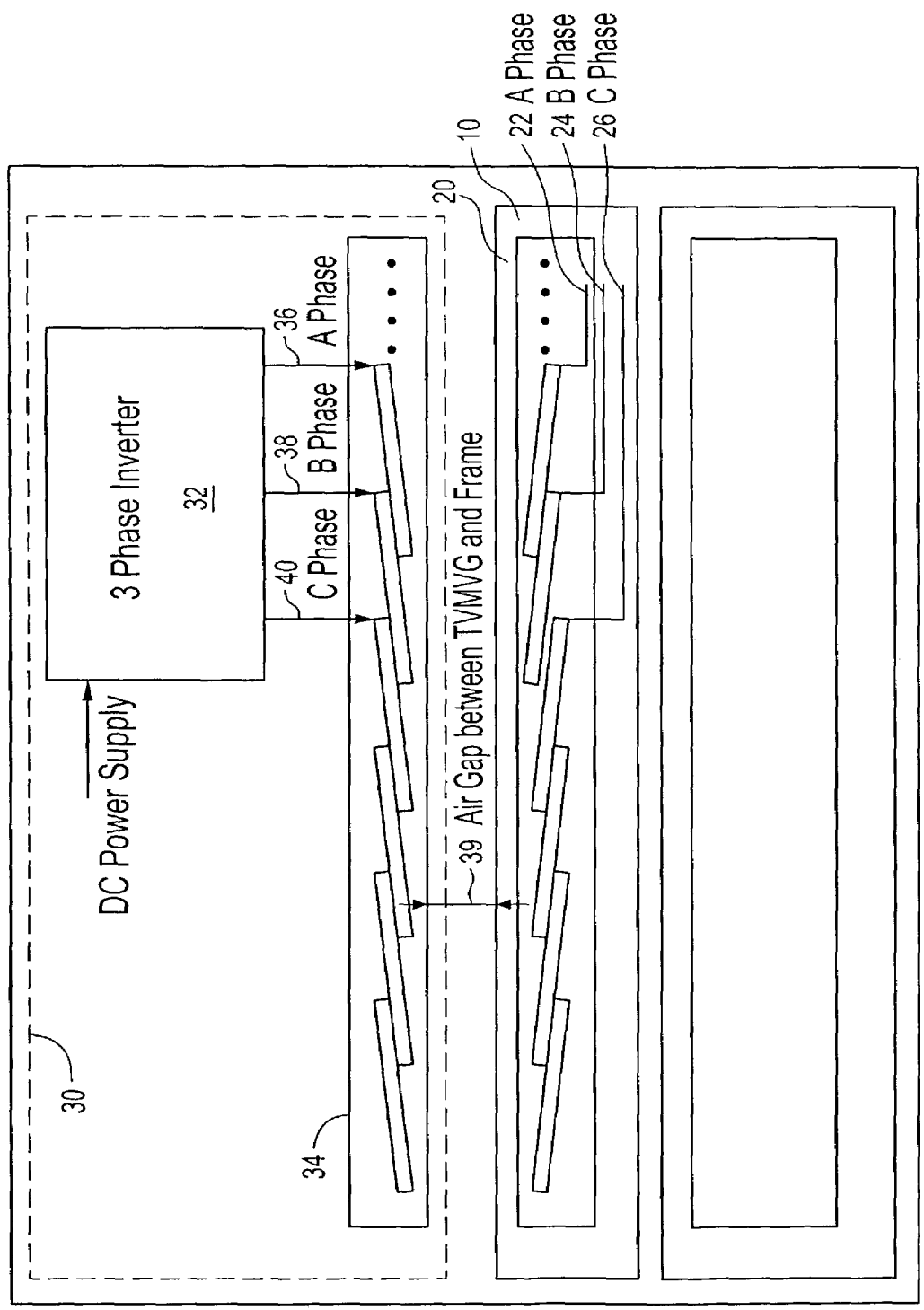
FIG. 2 is a side view of a time variable magnetic flux generator using AC power generator coils.
Figure 3:
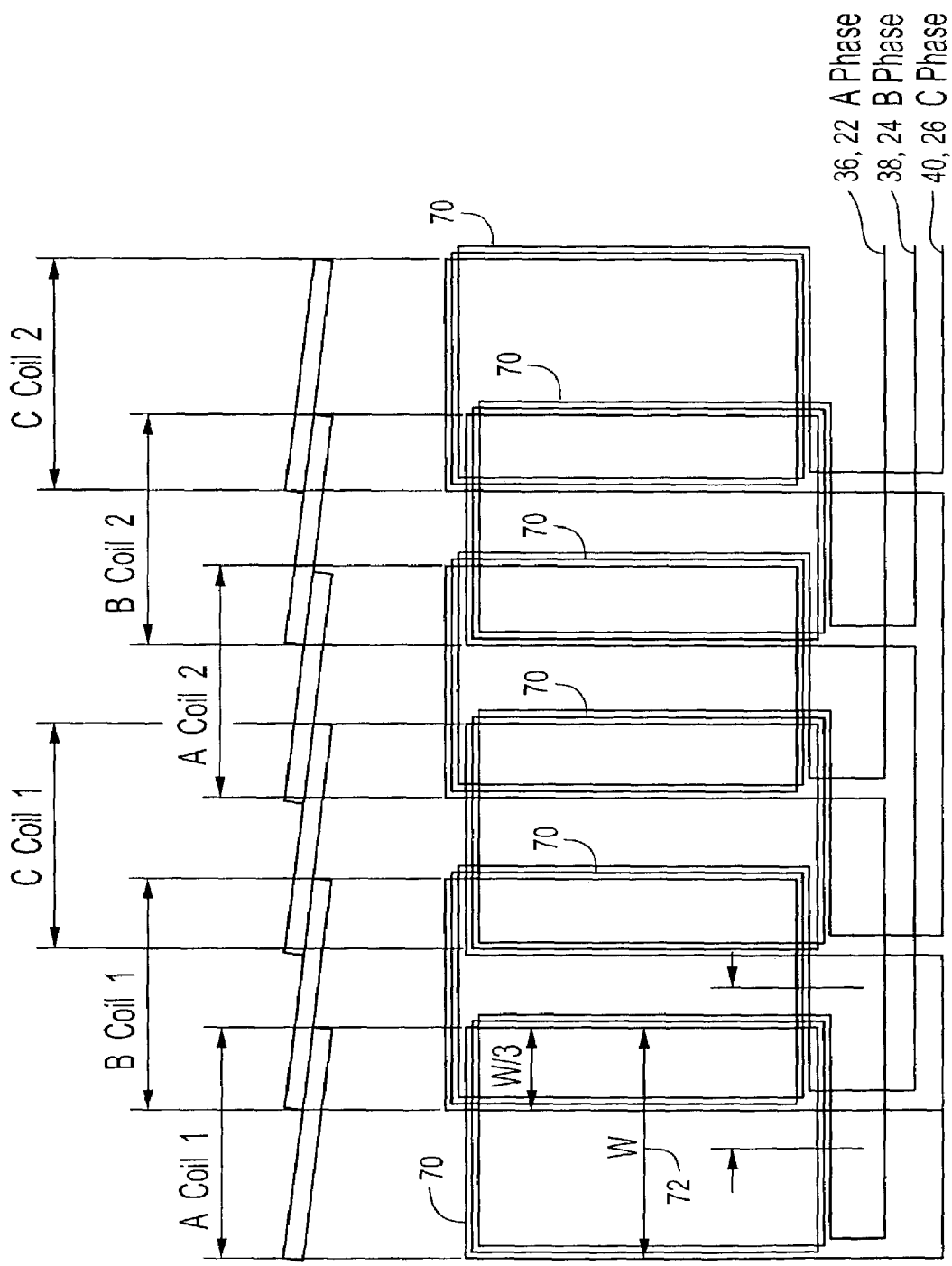
FIG. 3 shows side and top views of the AC power generator coils.

Referring to FIG. 2, a TVMFG 30 is shown. TVMFG 30 includes a three-phase inverter 32 and a TVMFG coil 34 having an A phase wire 36, B phase wire 38 and C phase wire 40. The TVMFG coil 34 is separated by an air gap 39 from the AC power generator coil 20 on the moveable display frame 10. AC power generator coil 20 on moveable display frame 10 has a similar structure to that of the TVMFG coil 34. AC power generator coil 20 includes three wires: A phase wire 22, B phase wire 24 and C phase wire 26. In a preferred embodiment, the phase wires 22, 24, 26 making up AC power generator coil 20 are embedded in the moveable display frame 10.

The three-phase inverter 32 provides three phases of 120 degree shifted AC current to TVMFG coil 34 and thereby generates a time variable magnetic flux that induces an AC current in AC power generator coil 20 of display frame 10.

Referring to FIGS. 1A, 1B, 2 and 3, the layout of the TVMFG coil 34 and AC power generator coil 20 is shown. Each of the A phase wire 36, B phase wire 38 and C phase wire 40 of the TVMFG coil 34, and the A phase wire 22, B phase wire 24 and C phase wire 26 of the AC power generator coil 20 is formed into a plurality of rectangular coils 70. In a preferred embodiment, the rectangular coils 70 are of equal width 72 and the overlap of adjacent rectangular coils 70 is equal to ⅓ of the width 72. Therefore, the center-to-center distance between adjacent rectangular coils 70 is equal to ⅔ of the width 72.

Figure 4:
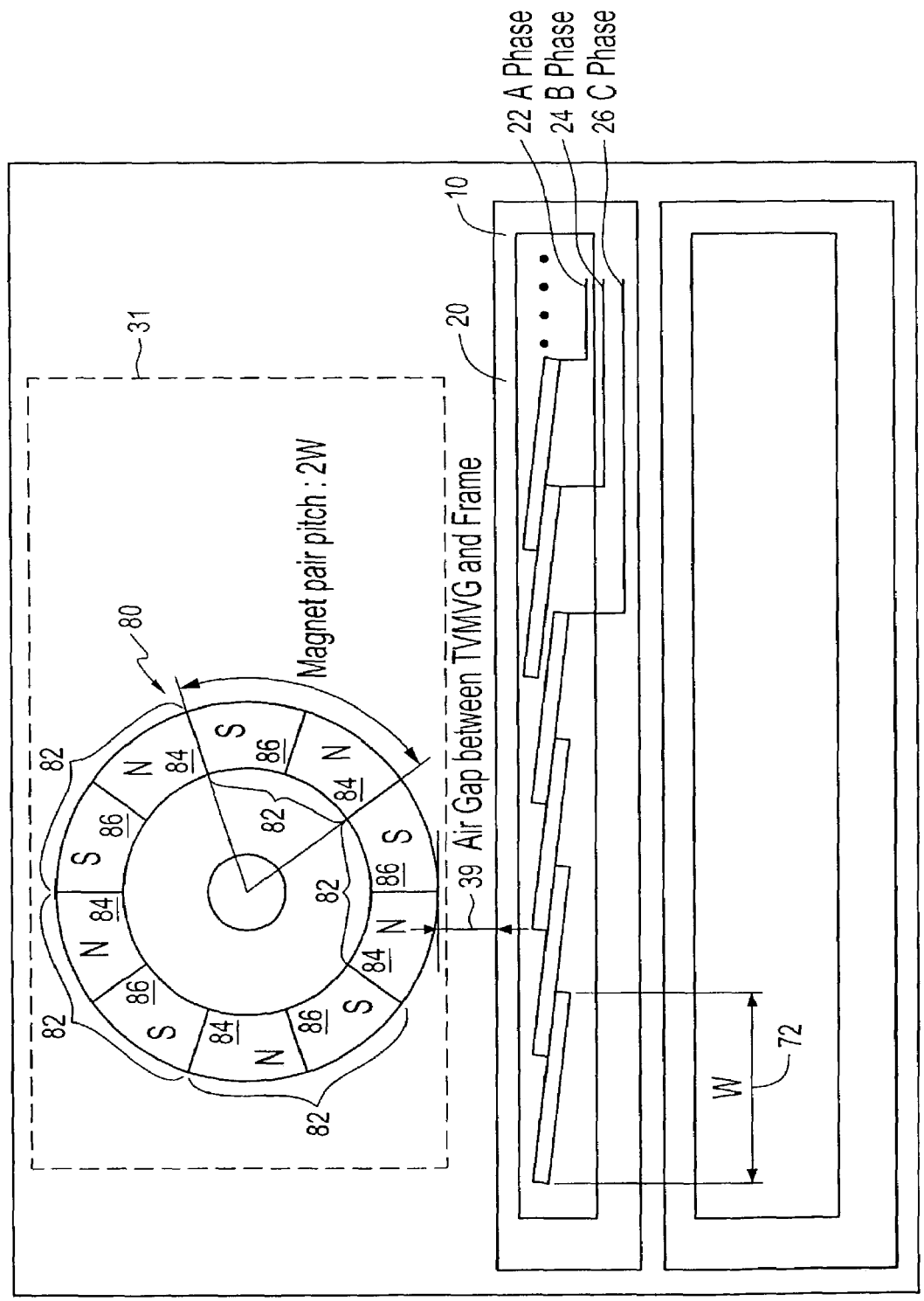
FIG. 4 is a side view of a time variable magnetic flux generator using a magnet wheel.

Referring to FIG. 4, an alternative embodiment 31 of a TVMFG 30 is shown that includes a magnet wheel 80 having a plurality of pairs of magnets 82. Each pair of magnets 82 comprises a north pole 84 and a south pole 86. The pitch of one pair of magnets along the perimeter of the magnet wheel 80 is twice the width 72 of the rectangular coils 70 of AC power generator coil 20. The magnet wheel 80 is driven by a motor (not shown) and is separated from the moveable display frames 10 and AC power generator coils 20 by air gap 39. The motion of the magnet wheel 80, creates a time variable magnetic flux which induces a current in AC power generator coil 20. This produces a 120 degree three phase voltage output from the AC power generator coil 20.

Referring to FIGS. 1a, 1b, 3 and 4, in order to make sure that a TVMFG 30 is always sufficiently proximate to the AC power generator coils 20 of moveable display frames 10, the PTP 64 should be:

$$PTP = i*FP + FP/n$$

Where n is the number of TVMFGs 30, and i is an integer value representative of the size of the TVMFGs 30 relative to FP 62. For example, if the TVMFG 30 are of negligible size, i=0 so that PTP=FP/n. However, if the TVMFGs 30 are of a size less than FP 62 but such that more than one TVMFG 30 cannot fit within FP 62, i=1 so that PTP=FP+FP/n. If the TVMFGs 30 are larger than FP 62 but smaller than 2 FP 62, i=2 so that PTP=2FP+FP/n.

Figure 5:
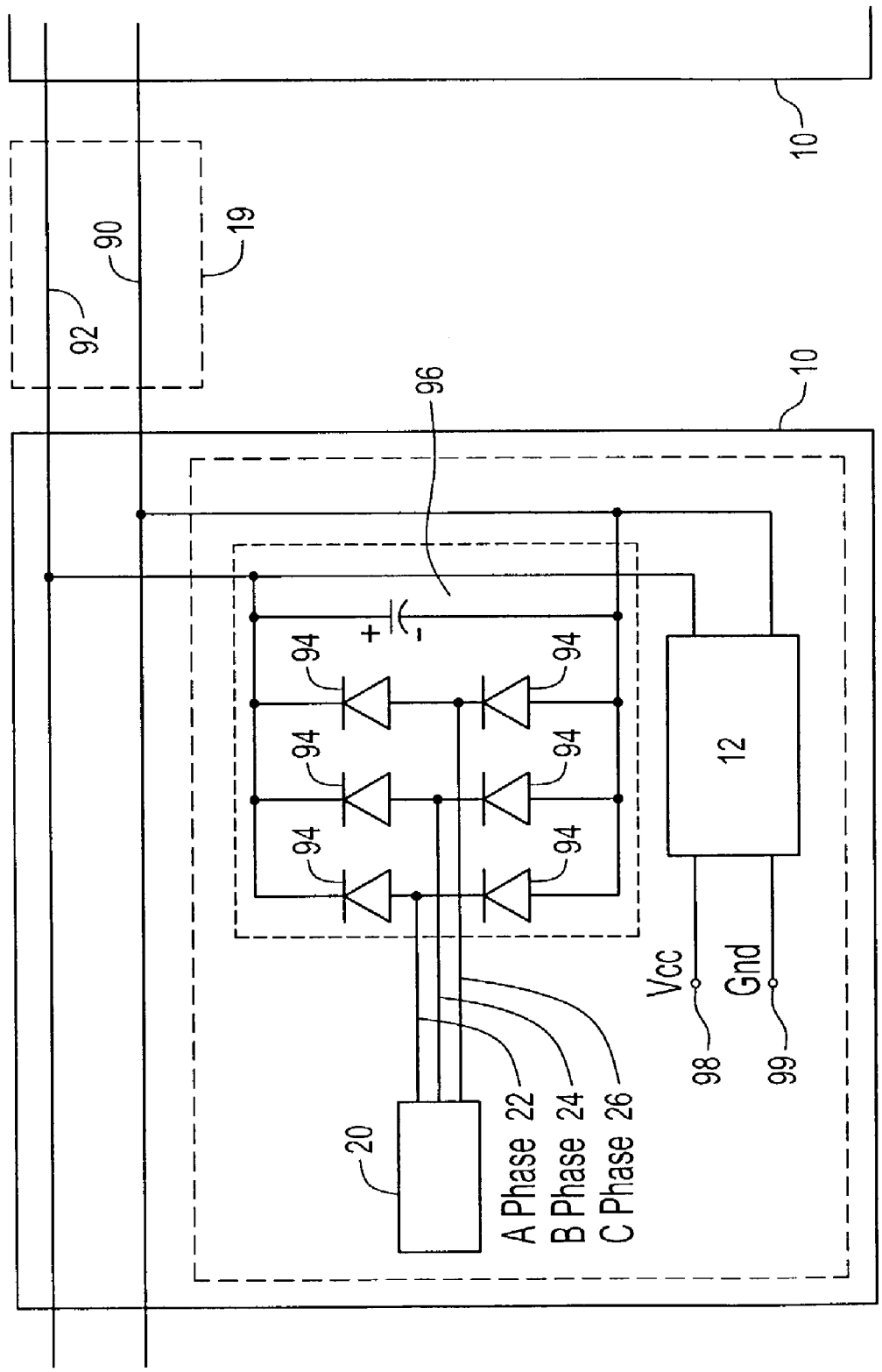
FIG. 5 shows an AC to DC rectifier circuit and power link cable.

Referring to FIG. 5, adjacent moveable display frames 10 are connected by power cable 19. Power cable 19 consists of ground cable 90 and DC current cable 92. AC to DC rectifier 11 consists of six rectifier diodes 94 and one capacitor 96. The input of AC to DC rectifier 11 is connected to three phase wires 22, 24, 26 of AC power generator coil 20. The DC output of AC to DC rectifier 11 is connected to DC current cable 92. DC-to-DC converter 12 is connected in parallel to ground wire 90 and DC current cable 92. The outputs of DC-to-DC converter 12 are connected to VCC 98 and ground 99.

When the AC power generator coil 20 of moveable display frame 10 is exposed to the time variable magnetic flux generated by TVMFG 30 (see FIG. 1B), current flows from AC power generator coil 20 to the DC to DC converter 12 and the DC current cable 92. If moveable display frame 10 is not close enough to TVMFG 30 to receive power therefrom, display panel 60 (see FIG. 1A), display controller 14, infrared data receiver 16 and DC to DC converter 12 of moveable display frame 10 receive DC current from other moveable display frames 10 via DC current cable 92. The DC-to-DC converter 12 changes the DC voltage received from the AC to DC rectifier 11 or DC current cable 92 to a stable voltage suitable for powering display controller 14 (see FIG. 1A), infrared data receiver 16 and display panel 60.

Figure 6:
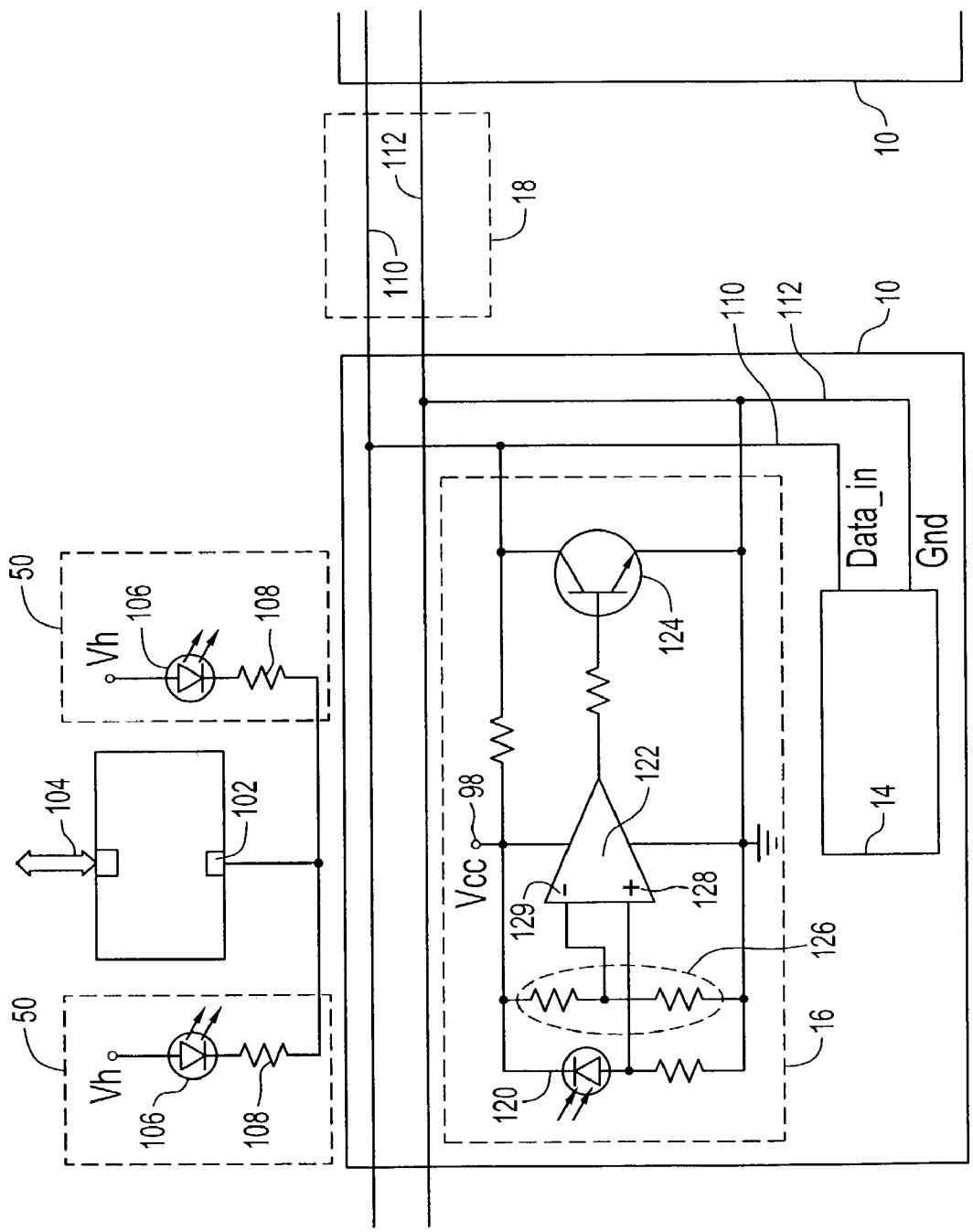
FIG. 6 shows an infrared data transmitter and a data receiver circuit.

Referring to FIG. 6, infrared data transmitters 50 are connected to microcontroller 100, via serial port 102. Microcontroller 100 receives display data from a computer, the internet, or other source (not shown), through serial port 104. Infrared data transmitters 50 include transmitting infrared diodes 106 and resistors 108.

Adjacent moveable display frames 10 are connected by data cable 18 consisting of data line 110 and ground 112. Infrared data receiver 16 is connected, in parallel with display controller 14, to data line 110 and ground 112. Infrared data receiver 16 comprises, in part, receiving infrared diode 120, comparator 122, transistor 124 and voltage divider 126. Voltage divider 126 consists of resistors 138 and 140.

Data received by one of the infrared data receivers 16 of one of the moveable display frames 10 is distributed to the other moveable display frames 10 via data line 110.

Referring to FIGS. 1a, 1b and 2–6, in a preferred embodiment the DTP 66 is:

$$DTP = i*FP + FP/n$$

Where i is an integer representative of the size of the infrared data transmitter 50 relative to FP 60, and where n is the number of infrared data transmitters 50. For example, if the infrared data transmitters 50 are of negligible size, i=0 so that DTP=FP/n. However, if the infrared data transmitters 50 are of a size such that more than one cannot fit within FP 62, i=1 so that DTP=FP+FP/n. If the infrared data transmitters 50 are larger than FP 62 but smaller than 2 FP 62, i=2.

Resistors 108 are used to limit the current to the transmitting infrared diodes 106. The DC power supply for the microcontroller 100 and infrared data transmitters 50 is Vh 114 which is completely independent of the power supplied to the display frames 10 via TVMFGs 30. If the voltage of serial port 102 of microcontroller 100 is high, the transmitting infrared diodes 106 will be off so that no infrared light is emitted. If the voltage of serial port 102 of microcontroller 100 is low, then the transmitting infrared diodes 106 will be on so that infrared light will be emitted.

Infrared light emitted by transmitting infrared diodes 106 is received by receiving infrared diode 120. If the transmitting infrared diodes 106 are off then the resistance of the receiving infrared diode 120 is high and the voltage to pin + 128 of the comparator 122 is lower than the voltage provided by the voltage divider 126, so that the output of the comparator 122 is low, the output of the transistor 124 is high and the output signal of the infrared data receiver 16 is high. If the transmitting infrared diodes 106 are on, the resistance of the receiving infrared diode 120 is low, the voltage to the pin +128 of the comparator 122 is higher than the voltage provided by the voltage divider 126, so that the output of the comparator 122 is high, the output of the transistor 124 is low and the output of the infrared data receiver 16 is low. The output of the infrared data receiver 16 reflects the state of the serial port 102 of the microcontroller 100. The data received by infrared data receiver 16 of one moveable display frame 10 is transmitted to other moveable display frames 10 via data line 110.

The data received by infrared data receiver 16 is also sent to display controller 14.

Figure 7:
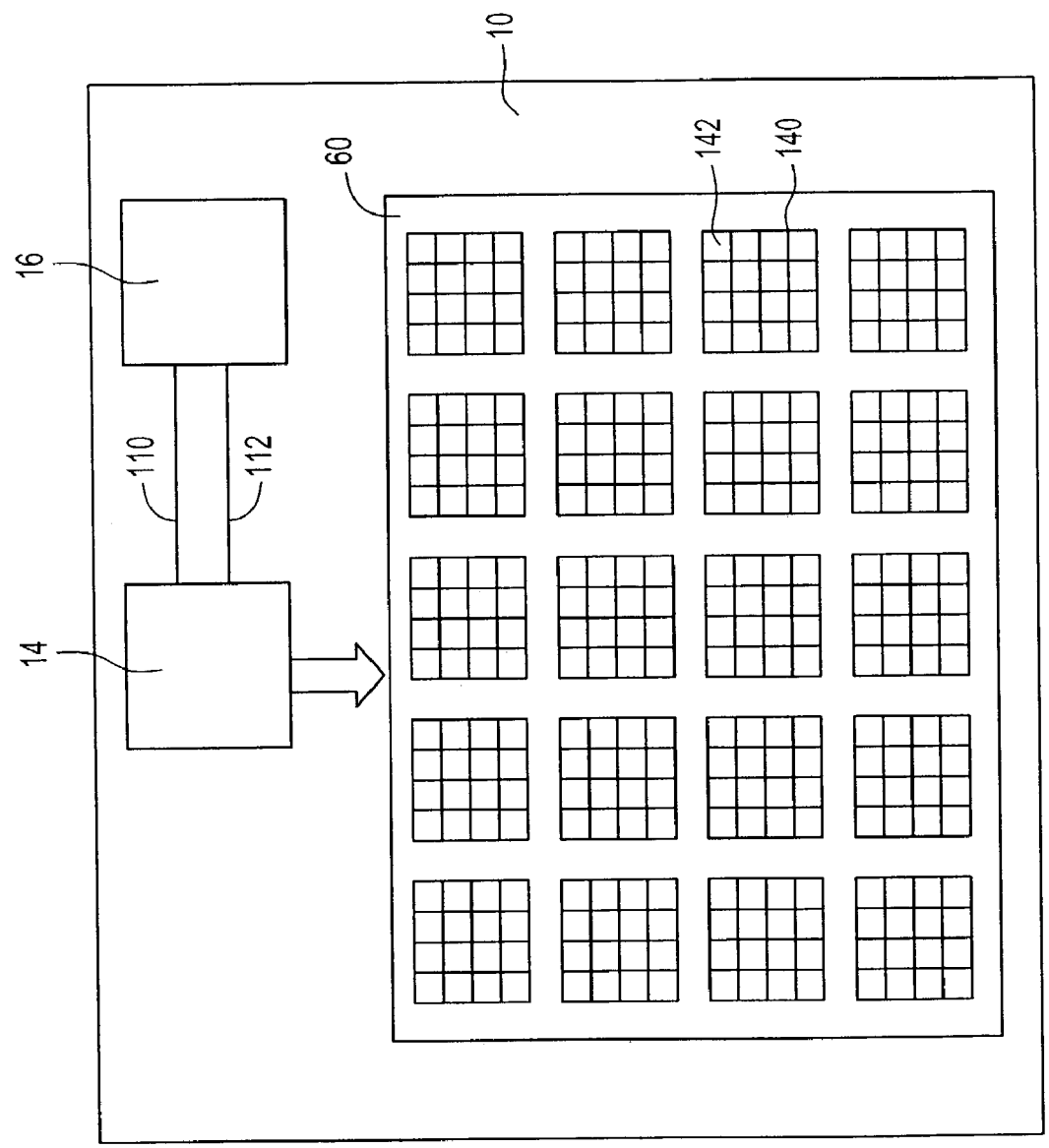
FIG. 7 is a top view of a display panel and controller.

Referring to FIG. 7, a moveable display frame 10 is shown comprising a display panel 60, display controller 14 and infrared data receiver 16. In a preferred embodiment the display panel 60 includes an array of LED's. Alternatively, the display panel 60 may have an LCD or Plasma display. The LED's comprising the display panel 60 are arranged in a plurality of display matrices 140. The display matrices 140 have a plurality of rows and columns of pixels 142. Each pixel 142 comprises a red, green and blue LED. Each display matrix 140 is an independent unit having its own data and power connections (not shown) such that if there is a problem with an individual display matrix 140 it may be removed from the display panel 60 and replaced with a new one.

The display controller 14 receives the display data from the infrared data receiver 16 and directs the appropriate portions of the data to individual display matrices 140.

Referring to FIGS. 5, 6 and 7, VCC 98 carries DC current from DC to DC converter 12 to display controller 14, infrared data receiver 16, and display panel 60.

Figure 8:
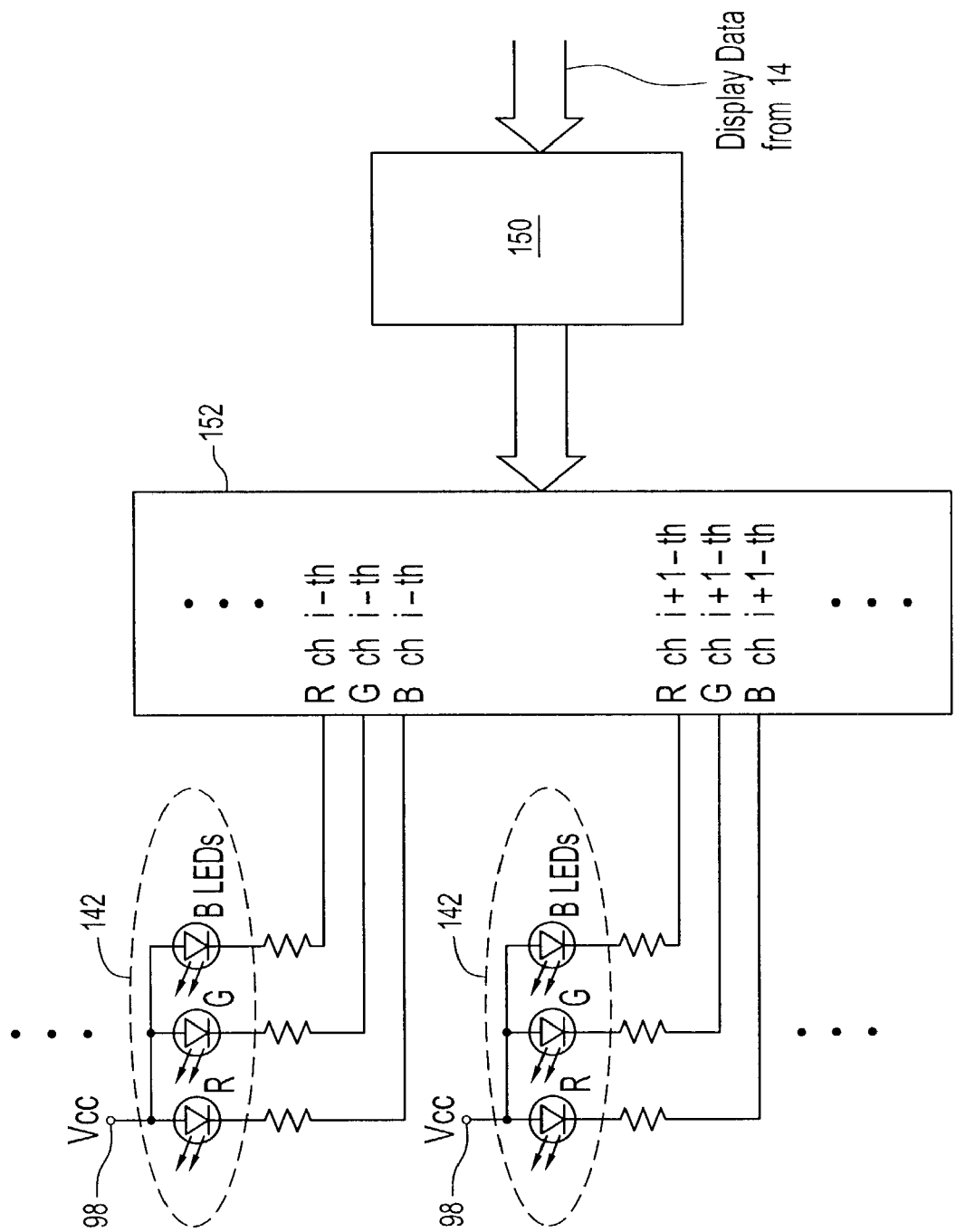
FIG. 8 shows a display pixel and data path.

Referring to FIGS. 7 and 8, an integrated circuit data buffer 150 receives digital display data from display controller 14. Data buffer 150 then sends the digital display data to digital-to-analog converter 152 where it is converted to continuous analog voltage signals used to control the brightness of the red, green and blue LED's of the pixels 142 making up the display panel 60. Since the digital-to-analog converter 152 has to have three times as many analog output channels as the total number of pixels, depending on the number of pixels 142 making up the display panel 60, a plurality of digital-to-analog converters 152 may be required. The digital-to-analog converters 152 may be connected to the data buffer 150 in series or in parallel.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A moveable display system comprising:
    (a) a fixed framework;
    (b) a moveable framework having a frame attached thereto, said moveable framework moveable relative to said fixed framework
    (c) a data transceiver coupled to each of said fixed framework and to said moveable framework, operative to transmit data between said fixed framework and said moveable framework;
    (d) a power transmitter coupled to said fixed framework and a power receiver coupled to said moveable framework without any electrical connection between said power transmitter and said power receiver, said frame having frame overlapping coils, and said fixed framework having a magnetic, flux generator which produces a time varying magnetic flux, said frame overlapping coils periodically moving through said time varying magnetic flux, thereby having induced in said frame overlapping coils, three phased power, and said frame having a display area operative to display video and/or text from said data.

2. The apparatus of claim 1, wherein said magnetic flux generator is a row of partially overlapping coils driven by an inverter.

3. The apparatus of claim 2, wherein said moveable display frames are linked by data cable capable of carrying data.

4. The apparatus of claim 3, wherein said data cable comprises a data wire and a ground wire.

5. The apparatus of claim 1, wherein said power transmitter comprises a time variable magnetic flux generator.

6. The apparatus of claim 5, wherein said time variable magnetic flux generator comprises a phase inverter connected to a plurality of wire coils, wherein, when phase shifted AC current is applied to said plurality of wire coils, a time variable magnetic flux is generated.

7. The apparatus of claim 1, wherein said data transmitter comprises a microcontroller comprising at least one serial port, said serial port being connected to an infrared light emitting diode.

8. The apparatus of claim 7, wherein when a voltage of said serial port is high, said infrared light emitting diode is off, and when a voltage of said serial port is low, said infrared light emitting diode is on.

9. The apparatus of claim 1, wherein said display frame is in the form of a plate of a baggage carousel.

10. The apparatus of claim 1, wherein said display frame forms part of a step of an escalator.

11. A system according to claim 1, wherein said time varying magnetic flux is produced by a ring of permanent magnets which have their poles radially oriented and, at an outer face of said permanent magnets, north and south poles alternating from one permanent magnet to the next.

12. A moveable display system, comprising:
(a) a fixed framework, (b) a moveable framework having a plurality of frames attached thereto, said moveable framework moveable relative to said fixed framework;
(c) a data transceiver coupled to each of said fixed framework and to said moveable framework, operative to transmit data between said fixed framework and said moveable framework;
(d) a power transmitter coupled to said fixed framework and a power receiver coupled to said moveable framework without any electrical connection between said power transmitter and said power receiver, each of said frames having frame overlapping coils, and said fixed framework having a time varying magnetic flux generator, said frame overlapping coils periodically moving past a time varying magnetic flux produced by said magnetic flux generator, thereby inducing in said frame overlapping coils, three-phased power to power electronics on said moveable framework, and said frames each having a display area operative to display video corresponding to said data.

13. The apparatus of claim 12, wherein said plurality of moveable display frames are connected to one another.

14. The apparatus of claim 13, wherein said moveable display frames are base plates of a baggage carousel.

15. The apparatus of claim 13, wherein said moveable display frames are linked by electrical cable capable of carrying electrical current.

16. The apparatus of claim 15, wherein said electrical cables comprise a DC wire and a ground wire.

17. The apparatus of claim 16, wherein data received by one of said moveable display frames from said data transmitter is transmitted to other ones of said moveable display frames by said data cable.

18. The apparatus of claim 15, wherein power received by one of said moveable display frames from said power transmitter is transmitted to other ones of said moveable display frames by said electrical wires.

19. The apparatus of claim 12, wherein each of said moveable display frames comprises:
a) a display panel for displaying images;
b) a data receiver for receiving data from said data transmitter;
c) a display controller for identifying data destined for said display panel, processing said data and distributing said data to said display panel; and
d) a power receiver for receiving power from said power transmitter.

20. The apparatus of claim 19 wherein said display panel comprises a plurality of light emitting diodes.

21. The apparatus of claim 19, wherein said data receiver comprises an infrared light emitting diode, wherein the electrical resistance of said light emitting diode is lowered in response to infrared light emitted by said data transmitter.

22. The apparatus of claim 19, wherein said display controller comprises a microcontroller.

23. The apparatus of claim 19, wherein said power receiver comprises a plurality of wire coils, an AC to DC rectifier and a DC to DC converter, wherein a current is induced in said plurality of wire coils by a time variable magnetic flux generated by said power transmitter.

24. A system according to claim 12, wherein said time varying magnetic flux is produced by a row of partially overlapping coils driven by an inverter.

25. A system according to claim 12, wherein said time varying magnetic flux is produced by a ring of permanent magnets which have their poles radially oriented and, at an outer face of sail permanent magnets, north and south poles alternating from one permanent magnet to the next.

* * * * *